US 12,076,859 B2

(12) United States Patent
Muthukamatchi et al.

(10) Patent No.: US 12,076,859 B2
(45) Date of Patent: Sep. 3, 2024

(54) INFINITE ROTATION OF VACUUM ROBOT LINKAGE THROUGH TIMING BELT WITH ISOLATED ENVIRONMENT

(71) Applicant: APPLIED MATERIALS, INC., Santa Clara, CA (US)

(72) Inventors: Karuppasamy Muthukamatchi, Madurai (IN); Akash Goyal, Karnataka (IN)

(73) Assignee: APPLIED MATERIALS, INC., Santa Clara, CA (US)

( * ) Notice: Subject to any disclaimer, the term of this patent is extended or adjusted under 35 U.S.C. 154(b) by 296 days.

(21) Appl. No.: 17/070,362

(22) Filed: Oct. 14, 2020

(65) Prior Publication Data
US 2022/0111513 A1 Apr. 14, 2022

(51) Int. Cl.
| B25J 9/10 | (2006.01) |
| B25J 9/04 | (2006.01) |
| B25J 15/04 | (2006.01) |
| B25J 15/06 | (2006.01) |
| B25J 19/00 | (2006.01) |

(52) U.S. Cl.
CPC .............. *B25J 9/1045* (2013.01); *B25J 9/04* (2013.01); *B25J 15/0441* (2013.01); *B25J 15/0616* (2013.01); *B25J 19/0075* (2013.01)

(58) Field of Classification Search
CPC ........ B25J 9/042; B25J 9/104; B25J 19/0075; B25J 19/0079; B25J 9/108; F16C 2300/62
See application file for complete search history.

(56) References Cited

U.S. PATENT DOCUMENTS

| 3,248,583 | A | | 4/1966 | Kullmann | |
| 4,728,252 | A | * | 3/1988 | Lada | B25J 9/042 |
| | | | | | 414/744.5 |
| 5,376,862 | A | | 12/1994 | Stevens | |
| 5,583,408 | A | | 12/1996 | Lowrance | |
| 5,856,719 | A | * | 1/1999 | De Armas | H02K 7/09 |
| | | | | | 310/104 |
| 6,494,666 | B2 | | 12/2002 | Wu et al. | |
| 6,889,004 | B2 | * | 5/2005 | Li | H01L 21/67115 |
| | | | | | 219/390 |
| 7,540,799 | B1 | | 6/2009 | Trojan | |
| 8,701,519 | B2 | | 4/2014 | Todorov | |
| 9,252,038 | B2 | * | 2/2016 | Nakao | B25J 9/1065 |
| 9,576,833 | B2 | | 2/2017 | Blank et al. | |
| 9,691,649 | B2 | | 6/2017 | Hoey et al. | |
| 9,948,155 | B2 | * | 4/2018 | Moura | B25J 11/0095 |
| 10,378,587 | B2 | * | 8/2019 | Sato | F16C 37/007 |
| 10,493,620 | B2 | | 12/2019 | Caveney | |
| 10,745,163 | B2 | * | 8/2020 | Trebbi | H02K 49/104 |

(Continued)

*Primary Examiner* — Bobby Rushing, Jr.
(74) *Attorney, Agent, or Firm* — Lowenstein Sandler LLP

(57) ABSTRACT

Disclosed herein are a vacuum robot, vacuum robot linkages that may enclose driving assemblies in a sealed environment configured to isolate at least a portion of the driving assemblies from the outside environment, and methods of operation thereof. Drive assemblies that may be enclosed in the sealed environment of the vacuum robot linkage may be infinite rotation driving assemblies that enable a robot link member to have a rotation of at least 360 degrees about an axis. The vacuum robot linkage environment may be sealed through a magnetic liquid rotary seal and/or through a fixed vacuum seal.

14 Claims, 7 Drawing Sheets

(56) References Cited

U.S. PATENT DOCUMENTS

| | | | | |
|---|---|---|---|---|
| 2002/0066330 A1* | 6/2002 | Namba | ............. | H01L 21/67742 |
| | | | | 74/490.01 |
| 2003/0011338 A1* | 1/2003 | Gilchrist | ........... | H01L 21/67742 |
| | | | | 318/568.21 |
| 2009/0243413 A1* | 10/2009 | Gilchrist | ................ | H02K 29/03 |
| | | | | 310/90.5 |
| 2013/0014605 A1* | 1/2013 | Caveney | .................. | B25J 9/126 |
| | | | | 901/23 |
| 2014/0154038 A1* | 6/2014 | Hudgens | ........... | H01L 21/67742 |
| | | | | 414/800 |
| 2015/0135880 A1* | 5/2015 | Zaruba | ..................... | B25J 9/042 |
| | | | | 74/490.01 |
| 2015/0258693 A1* | 9/2015 | Yazawa | ............. | H01L 21/67742 |
| | | | | 901/23 |
| 2016/0329234 A1* | 11/2016 | Krupyshev | ........ | H01L 21/67161 |
| 2018/0182658 A1* | 6/2018 | Goto | ........................ | B25J 9/042 |
| 2019/0030726 A1* | 1/2019 | Furukawa | ............ | B25J 15/0052 |

\* cited by examiner

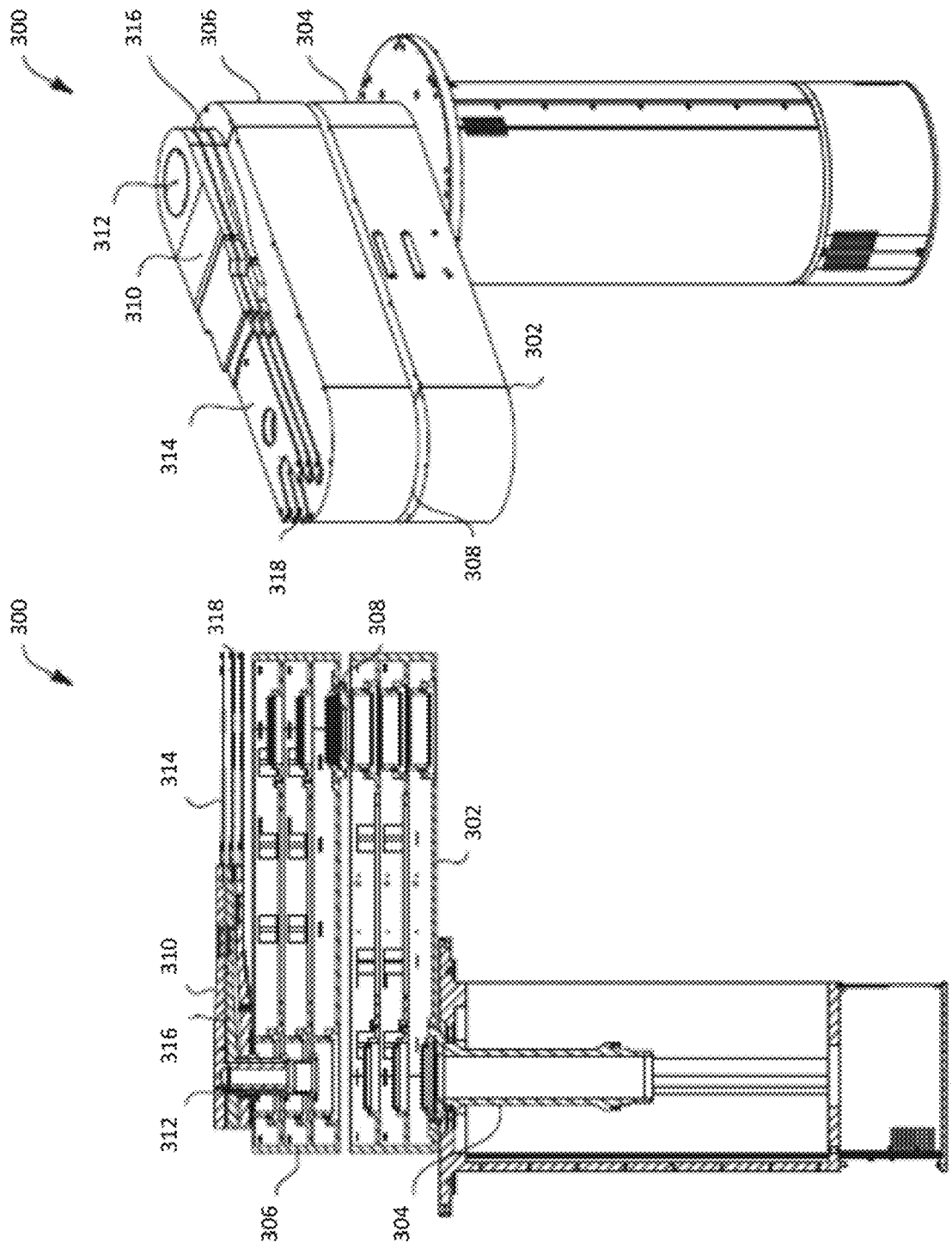

INFINITE ROTATION OF VACUUM ROBOT LINKAGE THROUGH TIMING BELT WITH ISOLATED ENVIRONMENT

FIELD

The disclosure relates generally to the field of robotics and substrate transfer systems, such as for example, robots utilizing various drive assemblies for transporting substrates between electronic device processing chambers. Also disclosed herein are systems and methods of use of such drive assemblies and associated robots.

BACKGROUND

Electronic device manufacturing systems typically include process tools having multiple process chambers and one or more load-lock chambers, which may be connected to a transfer chamber. Such process chambers may be used to carry out any number of processes on substrates (e.g., silicon-containing wafers, both patterned and unpatterned, masked wafers, glass plates, silica-containing articles, and so forth) such as deposition, oxidation, nitration, etching, polishing, cleaning, lithography, metrology, and so forth.

The process chambers may be distributed about the transfer chamber. A multi-arm robot can be housed within the transfer chamber and configured to transport substrates between the various chambers. For example, transfers may be between process chambers, or between process chambers and the one or more load lock chambers. Slit valves may be located at the entries into each respective chamber.

Conventional drive assemblies for robot arm mechanisms are unable to provide infinite (i.e., 360 degree) rotation of a link member of a robot arm about an axis. In particular, current vacuum robots use metal belts/bands that restrict joint rotation. For example, generally the possible rotation of robot arms for vacuum robots is limited to ±140° (280°) to ±160° (320°) angular span. Such restriction is because the metal belt wraps around each pulley only once and is secured to the pulley system. The pulley system for such robots is configured to prevent the belt from wrapping over itself. As such, when transferring wafers between chambers, the link members and attached end effectors, possibly having a substrate disposed thereon, may pass over other link members and attached end effectors holding other substrates. Any loose particulate matter on the top substrate and/or end effector may fall and drop onto the bottom substrate ultimately resulting in substrate defects. Such drive assemblies with less than full rotation also limit the flexibility of the robot arm when making transfers, which may cause the robot arms to make larger rotations than would otherwise be performed. For example, a robot arm may be rotated 150° in a first direction, and may have a maximum rotation of +/−160°. To move to a 210° rotation, the robot arm rotates 300° in the opposite direction to reach the same position rather than rotating an additional 50° in the same direction due to rotational constraints. Such a larger rotation takes much more time (e.g., 6 times the duration) to achieve.

BRIEF SUMMARY

According to various embodiments, disclosed herein is a first vacuum robot linkage that includes a body having an input side and an output side. The input side of the body receives through an input opening at least one power input shaft. The output side of the body receives through an output opening at least one power output shaft. The first vacuum robot linkage also includes a drive assembly for rotating a second vacuum robot linkage about an output axis on the output side of the body. The drive assembly includes at least one driving member, at least one driven member, and at least one transmission element. The at least one driving member is configured to interact with at least one power input shaft. At least one input seal is positioned, in the input opening, either: between that at least one driving member and the at least one power input shaft or in an open space formed between the at least one power input shaft and an input perimeter of the input opening. The at least one driven member is configured to interact with at least one power output shaft. The at least one power output shaft is attached to the second vacuum robot linkage. At least one output seal is positioned, in the output opening, either: between the at least one driven member and the at least one power output shaft or in an open space formed between the at least one power output shaft and the an output perimeter of the output opening. The at least one transmission element is configured to transmit power from the at least one driving member to the at least one driven member. The at least one input seal and the at least one output seal are configured to isolate the at least one driving member, the at least one driven member, and the at least one transmission element of the drive assembly inside the body of the first vacuum robot linkage and away from an outside environment.

According to various embodiments, disclosed herein is a vacuum robot that includes an upper arm, a first vacuum robot linkage, and a second vacuum robot linkage. The upper arm is rotatable about a shoulder axis. The first vacuum robot linkage includes a forearm body rotatable relative to the upper arm about a forearm axis at a position offset from the shoulder axis. The forearm body has an input side and an output side. The input side receives through an input opening at least one power input shaft. The output side receives through an output opening at least one power output shaft. The second vacuum robot linkage includes at least one end effector rotatable relative to the forearm about an output axis of the first vacuum robot linkage. The first vacuum robot linkage includes a first drive assembly for rotating the second vacuum robot linkage about the output axis. The first drive assembly includes at least one driving member, at least one driven member, and at least one transmission element. The at least one driving member is configured to interact with at least one power input shaft. At least one input seal is positioned, in the input opening, either: between that at least one driving member and the at least one power input shaft or in an open space formed between the at least one power input shaft and an input perimeter of the input opening. The at least one driven member is configured to interact with at least one power output shaft. The at least one power output shaft is attached to the second vacuum robot linkage. At least one output seal is positioned, in the output opening, either: between the at least one driven member and the at least one power output shaft or in an open space formed between the at least one power output shaft and the an output perimeter of the output opening. The at least one transmission element is configured to transmit power from the at least one driving member to the at least one driven member. The at least one input seal and the at least one output seal are configured to isolate the at least one driving member, the at least one driven member, and the at least one transmission element of the first drive assembly inside the forearm body and away from an outside environment.

According to various embodiments, disclosed herein is a method for operating a first vacuum robot linkage. The method includes causing interaction of at least one power input shaft with at least one driving member. The at least one power input shaft is received through an input opening of an input side of a body of the first vacuum robot linkage. At least one input seal is positioned, in the input opening, either: between that at least one driving member and the at least one power input shaft or in an open space formed between the at least one power input shaft and an input perimeter of the input opening. The interaction is configured to transmit power from the at least one driving member to an at least one driven member via at least one transmission element. The interaction is also configured to cause the at least one driven member to interact with at least one power output shaft. The at least one power output shaft is received through an output opening on an output side of the body of the first vacuum robot linkage. At least one output seal is positioned, in the output opening, either: between the at least one driven member and the at least one power output shaft or in an open space formed between the at least one power output shaft and the an output perimeter of the output opening.

BRIEF DESCRIPTION OF THE DRAWINGS

The present disclosure is illustrated by way of example, and not by way of limitation, in the figures of the accompanying drawings in which like references indicate similar elements.

FIG. 3A depicts a robot arm having at least one infinite rotation drive assembly enclosed in at least one vacuum robot linkage, according to various embodiments.

FIG. 3B depicts a robot arm having at least one infinite rotation drive assembly enclosed in at least one vacuum robot linkage, according to various embodiments.

DETAILED DESCRIPTION

Figure 1A:
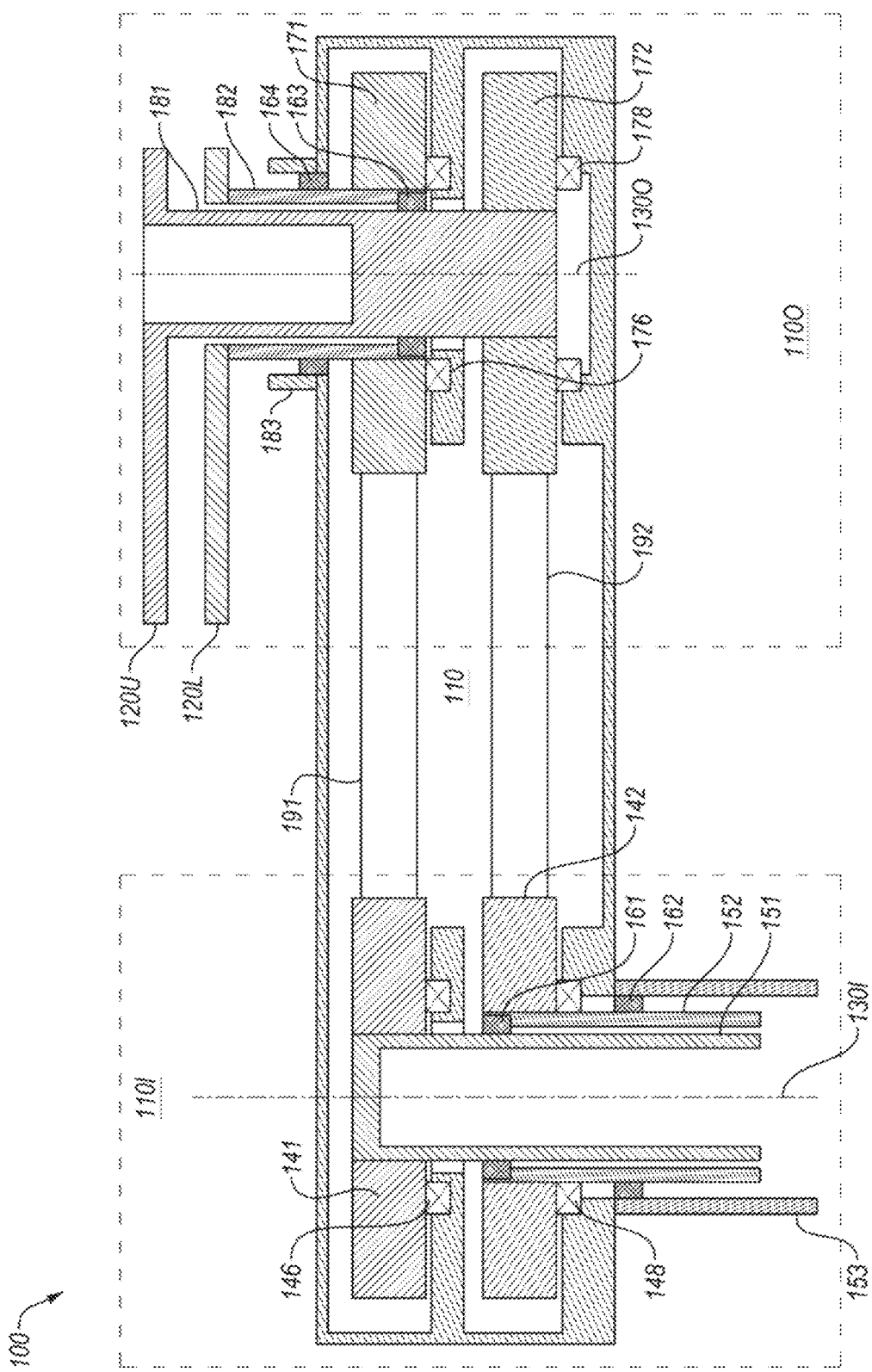
FIG. 1A depicts a cross-sectional view of an exemplary vacuum robot linkage, according to various embodiments.

Reference throughout this specification to, for example, "one embodiment," "certain embodiments," "one or more embodiments" or "an embodiment" means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments.

As used herein, the singular forms "a," "an," and "the" include plural references unless the context clearly indicates otherwise. Thus, for example, reference to "a robot arm" includes a single robot arm as well as more than one robot arm.

As used herein, the term "about" in connection with a measured quantity, refers to the normal variations in that measured quantity as expected by one of ordinary skill in the art in making the measurement and exercising a level of care commensurate with the objective of measurement and the precision of the measuring equipment. In certain embodiments, the term "about" includes the recited number ±10%, such that "about 10" would include from 9 to 11.

The term "at least about" in connection with a measured quantity refers to the normal variations in the measured quantity, as expected by one of ordinary skill in the art in making the measurement and exercising a level of care commensurate with the objective of measurement and precisions of the measuring equipment and any quantities higher than that. In certain embodiments, the term "at least about" includes the recited number minus 10% and any quantity that is higher such that "at least about 10" would include 9 and anything greater than 9. This term can also be expressed as "about 10 or more." Similarly, the term "less than about" typically includes the recited number plus 10% and any quantity that is lower such that "less than about 10" would include 11 and anything less than 11. This term can also be expressed as "about 10 or less."

The terms "belt" and "band" are used interchangeably herein and refer to a portion of a transmission element for an infinite rotation drive assembly according to embodiments.

According to embodiments, disclosed herein is a vacuum robot linkage with an isolated environment. A variety of drive assemblies utilizing various power transmission mechanisms may be incorporated inside the vacuum robot linkage. Since the vacuum robot linkage environment is isolated, if any particles are generated during the operation of the drive assembly, the particles will remain contained inside the isolated vacuum robot linkage environment.

In certain embodiments, described herein is a vacuum robot linkage having an infinite rotation drive assembly attained through a power transmission mechanism that includes a timing belt wrapped around two pulleys and coupled to a tensioner configured to maintain a certain tension in the timing belt. A timing belt rotation provides infinite rotation (i.e., of 360 degrees) since it is a fully connected belt. With a timing belt arrangement, the vacuum robot linkage has the flexibility to rotate to any degree that creates an optimal robot movement. Such flexibility in vacuum robot linkage rotation improves throughput since substrates may be transferred from one station to another with a minimal number of steps and/or minimal rotation. For example, a vacuum a robot arm may be rotated 150° in a first direction, and to achieve a next pick or place operation may be rotated to a 210° rotation. For a traditional vacuum robot arm, the arm may have a maximum rotation of +/−160°, and to move to a 210° rotation, the robot arm rotates 300° in the opposite direction to reach the same position. In contrast, the vacuum robot arm in embodiments simply rotates 50° in the same direction as it was already rotated. Such a smaller rotation takes much less time (e.g., ⅙ the time) to achieve.

Additional advantages of a timing belt power transmission mechanism include overall height reduction of the drive assembly, due to the utilization of one fully connected belt, as opposed to a plurality of belts positioned one on top of another, where each belt is attached to both pulleys. Furthermore, pulley bearings, if any, may also be positioned inside the isolated vacuum robot linkage environment, which reduces the risk of outgassing through the bearings.

While the timing belt power transmission mechanism is advantageous for enabling infinite rotation of the vacuum robot linkage about an axis, the rubbing action between the timing belt and pulleys may generate particles. If any particles are generated during operation of the timing belt mechanism, the particles will remain contained inside the isolated vacuum robot linkage environment.

According to embodiments, disclosed herein are various seals for isolating the vacuum robot linkage environment. According to one embodiment, the vacuum robot linkage environment is isolated using a magnetic liquid rotary seal, as described in further detail with respect to FIGS. 1A and 1B. According to another embodiment, the vacuum robot linkage environment is isolated using a fixed vacuum barrier, as described in further detail with respect to FIGS. 2A and 2B.

FIG. 1A depicts a cross-sectional view of an exemplary first vacuum robot linkage 100 that encloses a portion of an infinite rotation drive assembly in an isolated environment. The first vacuum robot linkage 100 has a body that includes an input side 110I and an output side 110O. The vacuum robot linkage encloses an interior volume 110 in which certain components of the drive assembly (e.g., an infinite rotation drive assembly) reside. The infinite rotation drive assembly is suitable for rotating a second vacuum robot linkage about an output axis 130O of the first vacuum robot linkage for a rotation of at least 360 degrees. In the embodiment illustrated in FIG. 1A, the second vacuum robot linkage is shown as lower end effector 120L and upper end effector 120U. In alternative embodiments, the second vacuum robot linkage may be a different part of a robot arm, e.g., a robot upper arm, a robot forearm, a robot wrist, and so on.

In certain embodiments, the drive assembly includes at least one driving member, such as a first timing pulley 141 and a second timing pulley 142, located inside interior volume 110. The driving member (e.g., first timing pulley 141 and second timing pulley 142) is configured to interact with its respective at least one power input shaft (such as inner power input shaft 151 and middle power input shaft 152). Middle power input shaft 152 may be a hollow cylinder that surrounds inner power input shaft 151 (which may also be in a form of a cylinder). Middle power input shaft 152 is spaced from inner power input shaft 151 by a first distance.

The body of the first vacuum robot linkage includes an input opening on its input side through which the at least one power input shaft(s) are received. The perimeter of the input opening, which may be referred to herein as "input perimeter" is shown in FIG. 1A as an outer input shaft 153 that surrounds middle power input shaft 152 and is spaced from middle power input shaft by a second distance. In certain embodiments, an outer input shaft 153 that aligns with the input perimeter may be attached to the first vacuum robot linkage.

An outer input shaft 153, if present, may be attached to a preceding part of the vacuum robot. For example, if first vacuum robot linkage 100 is a wrist portion, outer input shaft 153 may be attached to the forearm portion of the vacuum robot arm. In another example, if first vacuum robot linkage 100 is a forearm portion, outer input shaft 153 may be attached to the upper arm portion of the vacuum robot arm. In yet another example, if first vacuum robot linkage 100 is an upper arm portion, outer input shaft 153 may be attached to the shoulder portion of the vacuum robot arm. At least a portion of power input shafts (inner power input shaft 151 and middle power input shaft 152) as well as outer input shaft 153 may be located outside interior volume 110 and may be each independently rotatable around input axis 130I.

In certain embodiments, each of the driving members are supported by a corresponding pulley bearing. In FIG. 1A, first timing pulley 141 is supported by a first pulley bearing 146 and second timing pulley 142 is supported by a second pulley bearing 148. The pulley bearings are configured to align (e.g., center) their corresponding driving members and support any external load exerted on their corresponding driving members. In embodiments, the pulley bearings reside inside the interior volume of the first vacuum robot linkage body. As will be described herein below, the interior volume of the first vacuum robot linkage is sealed from the outside environment through at least one input seal and at least one output seal. Placing the pulley bearings inside this sealed interior volume advantageously reduces the risk of outgassing through the bearings.

Interior volume 110 may be isolated from the outside environment via at least one input seal that is positioned either between at least one driving member and at least one power input shaft or in an open space formed between at least one power input shaft and an input perimeter of the input opening (e.g., second distance between 152 and 153). In certain embodiments, the at least one input seal is also positioned in an open space between any two adjacent power input shafts (if two or more power input shafts are present such as in first distance between 151 and 152). In FIG. 1A, a first input seal 161 is located in a first space between inner power input shaft 151 and middle power input shaft 152. In FIG. 1A, a second input seal 162 is located in a second space between middle power input shaft 152 and outer input shaft 153. First input seal 161 and second input seal 162 may each be a magnetic liquid rotary seal (which also may be referred to as a ferrofluidic seal).

The magnetic liquid rotary seal is advantageous since it operates with minimal maintenance, has extremely low leakage, has a long operating life, has a low drag torque, and is versatile and compatible with many applications. The magnetic liquid rotary seal is a series of rings made of ultra-low vapor pressure, oil based liquid held magnetically between the rotor and the stator. For example, in FIG. 1A, in the scenario where inner power input shaft 151 rotates and middle power input shaft 152 remains put, the rotor would be inner power input shaft 151 and the stator would be middle power input shaft 152. In another example, in FIG. 1A, in the scenario where inner power input shaft 151 and outer input shaft 153 remain put, and middle power input shaft 152 rotates, the rotor would be middle power input shaft 152 and the stator would be inner power input shaft 151 and outer input shaft 153. Magnetic liquid rotary seals may also be advantageously utilized in ultra-high vacuum environments and high temperatures such as those frequently utilized in semiconductor processing environments (e.g., main frames).

Figure 2A:
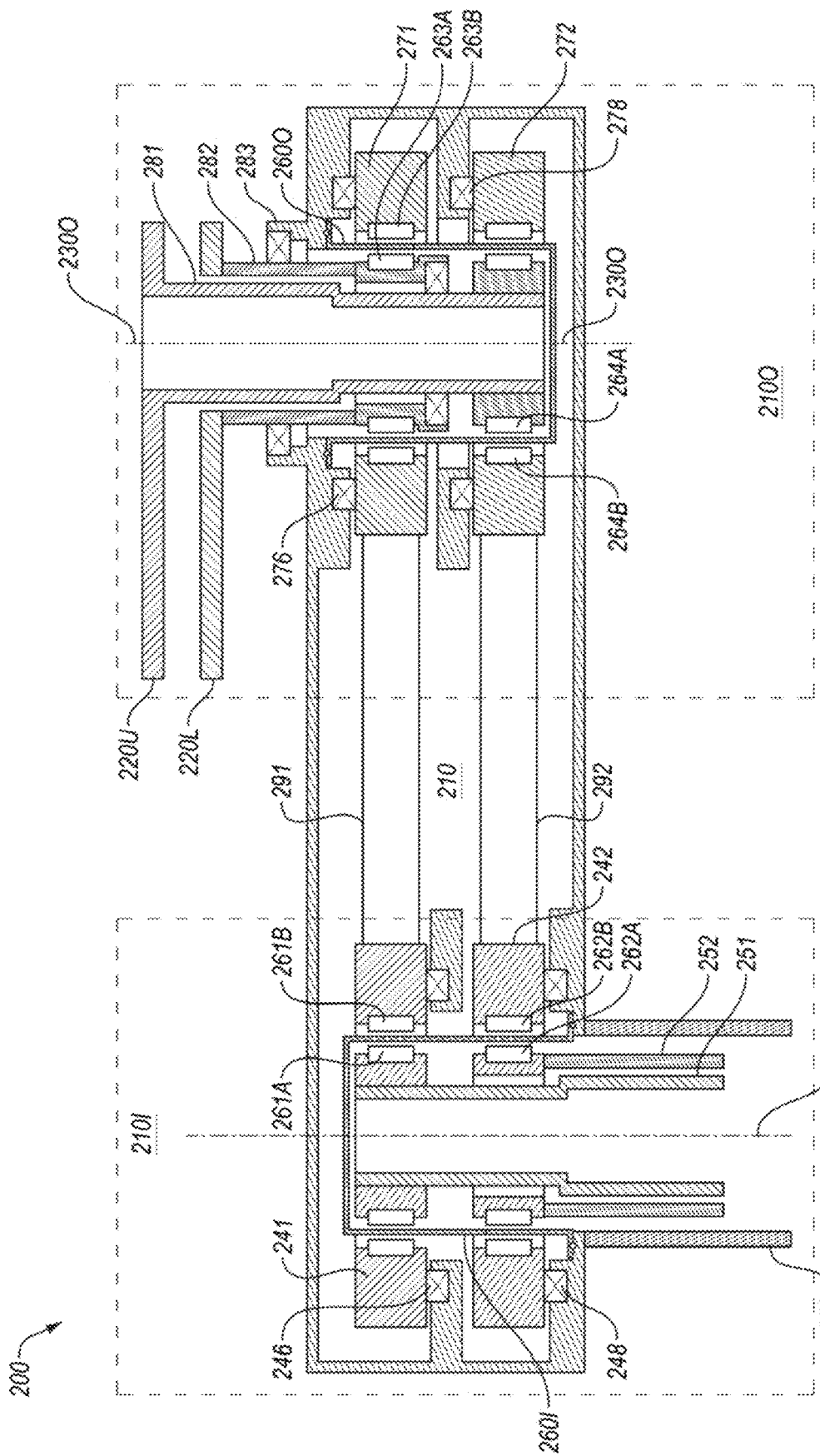
FIG. 2A depicts a cross-sectional view of an exemplary vacuum robot linkage, according to various embodiments.
Figure 2B:
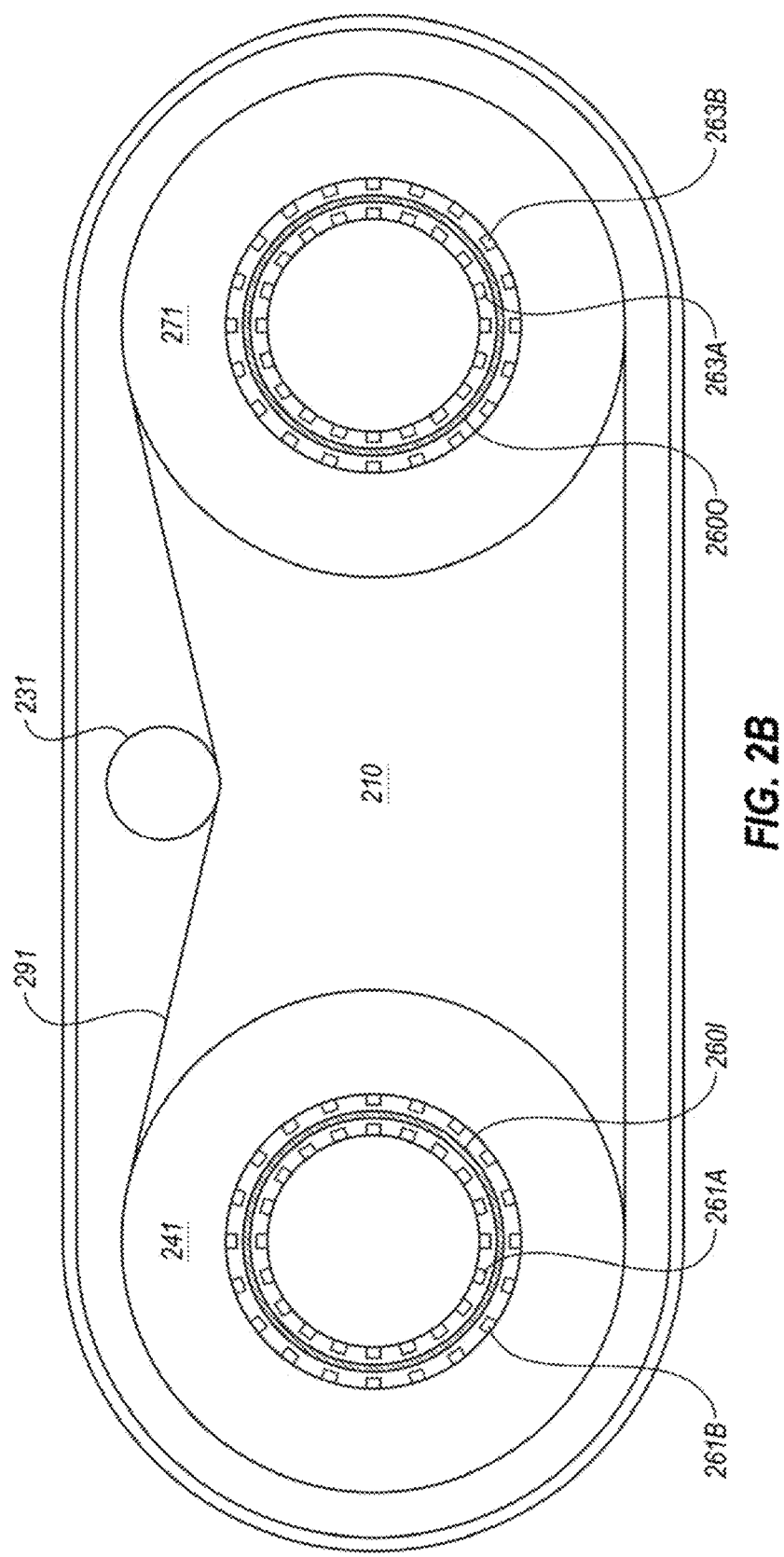
FIG. 2B depicts a top view of an infinite rotation drive assembly utilized in the vacuum robot linkage of FIG. 2A, according to various embodiments.

The at least one power input shaft interacts with its corresponding at least one driving member. In certain embodiments, said interaction between the at least one driving member and the at least one power input shaft is through at least one input seal (e.g., as shown in FIGS. 2A and 2B). In other embodiments, the upper end of at least one power input shaft is attached to the at least one driving member. For instance, in FIG. 1A, upper end of inner power input shaft 151 is attached to first timing pulley 141. As inner power input shaft 151 rotates, it causes first timing pulley 141 to also rotate. The rotation of inner power input shaft 151 is relative to middle power input shaft 152, which is spaced from inner power input shaft 151 by a first distance that is sealed with first input seal 161 (e.g., first magnetic liquid rotary input seal).

Similarly, in FIG. 1A, the upper end of middle power input shaft 152 is attached to second timing pulley 142. As middle power input shaft 152 rotates, it causes second timing pulley 142 to also rotate. The rotation of middle power input shaft 152 is independent of and it relative to inner power input shaft 151, which is spaced from middle power input shaft 152 by the first distance that is sealed with first input seal 161 (e.g., first magnetic liquid rotary input seal). The rotation of middle power input shaft 152 is also independent of and relative to outer input shaft 153, which is spaced from middle power input shaft 152 by a second distance that is sealed with second input seal 162 (e.g., second magnetic liquid rotary input seal).

In certain embodiments, the drive assembly includes at least one driven member, such as a first power output pulley 171 and a second power output pulley 172, located inside interior volume 110 on the output side 110O of interior volume 110 (and of the body of the first vacuum robot linkage). The driven member (e.g., first power output pulley 171 and a second power output pulley 172) is configured to interact with at least one power output shaft, such as inner power output shaft 181 and middle power output shaft 182. Middle power output shaft 182, which may be a hollow cylinder, surrounds inner power output shaft 181 (which may be in a form of a cylinder) and is spaced from inner power output shaft 181 by a third distance. The body of the first vacuum robot linkage includes an output opening on its output side through which the at least one power output shaft(s) are received. The perimeter of the output opening, which may be referred to herein as "output perimeter" is shown in FIG. 1A as an outer output shaft 183 that surrounds middle power output shaft 182 and is spaced from middle power output shaft by a fourth distance. In certain embodiments, an outer output shaft 183 that aligns with the output perimeter may be attached to the first vacuum robot linkage. The power output shafts (inner power output shaft 181 and middle power output shaft 182) as well as outer output shaft 183 may be, at least partially, located outside interior volume 110 and may each be independently rotatable around output axis 130O that is offset laterally from input axis 130I.

In certain embodiments, each of the driven members are supported by a corresponding pulley bearing. In FIG. 1A, first power output pulley 171 is supported by a third pulley bearing 176 and second power output pulley 172 is supported by a fourth pulley bearing 178. The pulley bearings are configured to align (e.g., center) their corresponding driven members and support any external load exerted on their corresponding driven members. In embodiments, the pulley bearings reside inside the interior volume of the first vacuum robot linkage body. As will be described herein below, the interior volume of the first vacuum robot linkage is sealed from the outside environment through at least one input seal and at least one output seal. Placing the pulley bearings inside this sealed interior volume advantageously reduces the risk of outgassing through the bearings.

Interior volume 110 may be isolated from the outside environment via at least one output seal that is positioned either between at least one driven member and at least one power output shaft/or in an open space formed between at least one power output shaft and the output perimeter of the output opening (e.g., fourth distance between 182 and 183). In certain embodiments, the at least one output seal is also positioned in the open space formed between any two adjacent power output shafts (if two or more power output shafts are present such as in the third distance between 181 and 182). In FIG. 1A, a third output seal 163 is located in a third distance between inner power output shaft 181 and middle power output shaft 182. In FIG. 1A, a fourth output seal 164 is located in a fourth distance between middle power output shaft 182 and outer output shaft 183. Third output seal 163 and fourth output seal 164 may each be a magnetic rotary liquid seal as described above with respect to first input seal 161 and second input seal 162.

In certain embodiments, the at least one driven member interacts with its corresponding at least one power output shaft through at least one output seal (e.g., as shown in FIGS. 2A and 2B). In other embodiments, the lower end of the at least one power output shaft is attached to the at least one driven member. For instance, in FIG. 1A, first power output pulley 171 is attached to the lower end of middle power output shaft 182. As first power output pulley 171 rotates, it causes middle power output shaft 182 to also rotate along output axis 130O. The rotation of middle power output shaft 182 is independent of and relative to inner power output shaft 181, which is spaced from middle power output shaft 182 by a third distance that is sealed with third output seal 163 (e.g., third magnetic liquid rotary output seal). The rotation of middle power output shaft 182 is also independent of and relative to outer output shaft 183, which is spaced from middle power output shaft 182 by a fourth distance that is sealed with a fourth output seal 164 (e.g., fourth magnetic liquid rotary output seal). The upper end of middle power output shaft 182 is attached to the lower end effector 120L (i.e., a constituent of the second vacuum robot linkage in FIG. 1A) and rotation of middle power output shaft 182 causes rotation of lower end effector 120L along output axis 130O.

Similarly, in FIG. 1A, second power output pulley 172 is attached to the lower end of inner power output shaft 181. As second power output pulley 172 rotates, it causes inner power output shaft 181 to also rotate along output axis 130O. The rotation of inner power output shaft 181 is independent of and relative to middle power output shaft 182, which is spaced from inner power output shaft 181 by the third distance that is sealed with third output seal 163 (e.g., third magnetic liquid rotary output seal). Upper end of inner power output shaft 181 is attached to the upper end effector 120U (i.e., a constituent of the second vacuum robot linkage in FIG. 1A) and rotation of inner power output shaft 181 causes rotation of upper end effector 120U along output axis 130O.

In certain embodiments, the drive assembly includes at least one transmission element, such as a first timing belt 191 and a second timing belt 192. The at least one transmission element is configured to transmit power from the at least one driving member (e.g., first timing pulley 141 and second timing pulley 142) to the at least one driven member (e.g., first power output pulley 171 and a second power output pulley 172). For instance, in FIG. 1A, first timing belt 191 is wrapped around first timing pulley 141 on one end and wrapped around power output pulley 171 on the other opposite end. First timing belt 191 is configured to transmit power (that was received from inner power input shaft 151) from first timing pulley 141 to first power output pulley 171 to rotate middle power output shaft 182 and lower end effector 120L. Similarly, in FIG. 1A, second timing belt 192 is wrapped around second timing pulley 142 on one end and wrapped around second power output pulley 172 on the other opposite end. Second timing pulley 192 is configured to transmit power (that was received from middle power input shaft 152) from second timing pulley 142 to second power output pulley 172 to rotate inner power output shaft 181 and upper end effector 120U.

The at least one transmission element (e.g., first timing belt 191 and second timing belt 192) are each activated, through the corresponding driving member (e.g., first timing pulley 141 and second timing pulley 142) that they are attached to, after said driving member receives power input from its corresponding power input shaft (e.g., inner power input shaft 151 and middle power input shaft 152). For instance, in FIG. 1A, first timing pulley 141 is configured to activate first timing belt 191, after first timing pulley 141 interacted and received power input from inner power input shaft 151. Similarly, in FIG. 1A, second timing pulley 142 is configured to activate second timing belt 192, after second timing pulley 142 interacted and received power input from middle power input shaft 152.

Each driven member (e.g., first power output pulley 171 and second power output pulley 172) utilizes power transmitted from their corresponding transmission element (e.g., first timing belt 191 and second timing belt 192) to interact with their corresponding power output shafts (e.g., inner power output shaft 181 and middle power output shaft 182). For instance, in FIG. 1A, first power output pulley 171 is configured to utilize power transmitted from first timing belt 191 to interact with middle power output shaft 182 to rotate lower end effector 120L. Similarly, in FIG. 1A, second power output pulley 172 is configured to utilize power transmitted from second timing belt 192 to interact with inner power output shaft 181 to rotate upper end effector 120U.

In the embodiment illustrated in FIG. 1A, four magnetic liquid rotary seals (e.g., 161 and 162 on input side 110I; 163 and 164 on output side 110O) are used to form isolated environment inside interior 110 of vacuum robot linkage 100. The at least one driving member (e.g., first timing pulley 141 and second timing pulley 142), at least one transmission element (e.g., first timing belt 191 and second timing belt 192), and at least one driven member (e.g., first power output pulley 171 and second power output pulley 172) of the drive assembly reside inside interior 110 (i.e., inside the body of the first vacuum robot linkage) and are isolated away from the outside environment. Isolated interior 110 of the vacuum robot linkage 100 may be a controlled environment that is, e.g., in atmospheric pressure or in a different controlled pressure. In this manner, during operation of the various constituents of the drive assembly, if any particles form (e.g., due to friction between components such as between the timing belt and the various pulleys), the particles remain contained within interior 110 and do not contaminate the outside environment.

Figure 1B:
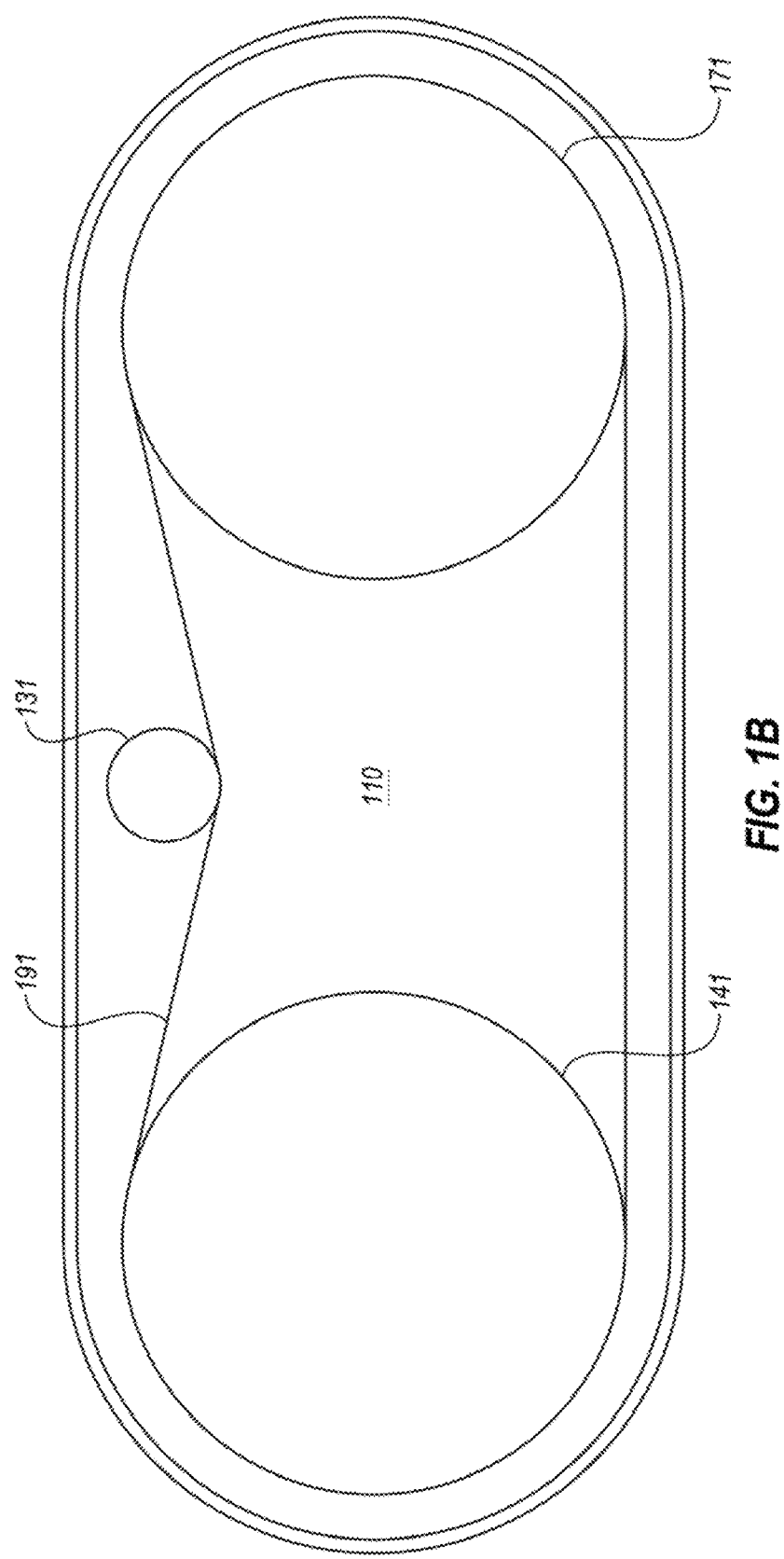
FIG. 1B depicts a top view of an infinite rotation drive assembly utilized in the vacuum robot linkage of FIG. 1A, according to various embodiments.

FIG. 1B depicts a top view of one driving member (e.g., first timing pulley 141 or second timing pulley 142), one transmission element (e.g., first timing belt 191 or second timing belt 192), and one driven member (e.g., first power output pulley 171 or second power output pulley 172). In the embodiments depicted in FIGS. 1A and 1B, power is transferred from at least one power input shaft (e.g., 151, 152) to at least one driving member (e.g., 141, 142). The power is transmitted from the at least one driving member (e.g., 141, 142) through at least one transmission element (e.g., 191, 192) to at least one driven member (e.g., 171, 172) and from there to at least one power output shaft (e.g., 181, 182). The tension in the at least one transmission element (e.g., 191, 192) may be further controlled through at least one tensioner element. For instance, in FIG. 1B, a first tensioner element 131 configured to control tension in the first timing belt 191 is depicted. Similarly, the driving assembly can include a second tensioner element configured to control tension in second timing belt 192. As shown in FIG. 1B, the at least one driving member, at least one driven member, at least one power transmission element, and the at least one tensioner element reside in interior environment 110, which is isolated from the outside environment through input seals 161, 162 and output seals 163,164 (shown in FIG. 1A).

FIG. 2A depicts a cross-sectional view of an exemplary first vacuum robot linkage 200 that encloses a portion of a drive assembly (such as an infinite rotation drive assembly) in an isolated environment. The first vacuum robot linkage 200 is similar to first vacuum robot linkage 100 described with respect to FIGS. 1A and 1B, except that the input seal and output seal in FIGS. 2A and 2B comprise a fixed vacuum barrier and the power transmission mechanism of the rotation assembly is adapted to accommodate the fixed vacuum barrier.

Similar to first vacuum robot linkage 100, first vacuum robot linkage 200 includes a body having an input side 210I and an output side 210O. The first vacuum robot linkage 200 encloses an interior volume 210 in which certain components of an infinite rotation drive assembly reside. The infinite rotation drive assembly is suitable for rotating a second vacuum robot linkage about an output axis 230O of the body of the first vacuum robot linkage 200 for an infinite rotation of at least 360 degrees about the output axis 230O. In the embodiment illustrated in FIG. 2A, the second vacuum robot linkage is shown as lower end effector 220L and upper end effector 220U. In alternative embodiments, the second vacuum robot linkage may be a different part of a robot arm, e.g., a robot upper arm, a robot forearm, a robot wrist, and so on.

In certain embodiments, the drive assembly includes at least one driving member, such as a first timing pulley 241 and a second timing pulley 242, located inside interior volume 210 on the input side 210I. The driving member (e.g., first timing pulley 241 and second timing pulley 242) is configured to interact with at least one power input shaft, such as inner power input shaft 251 and middle power input shaft 252. Middle power input shaft 252 may be a hollow cylinder that surrounds inner power input shaft 251 (which may also be a cylinder).

The body of the first vacuum robot linkage 200 includes an input opening on its input side through which the at least one power input shaft(s) are received. The perimeter of the input opening, which may be referred to herein as "input perimeter" is shown in FIG. 2A as an outer input shaft 253 that surrounds middle power input shaft 252. In certain embodiments, an outer input shaft 253 that aligns with the input perimeter may be attached to the first vacuum robot linkage 200. The power input shafts (inner power input shaft 251 and middle power input shaft 252) as well as outer input shaft 253 may be located outside interior volume 210 and may each be independently rotatable around input axis 230I.

Outer input shaft 253 may be attached to a preceding part of the robot (similar to outer input shaft 153). For example, if first vacuum robot linkage 200 is a wrist portion, outer input shaft 253 may be attached to the forearm portion of the vacuum robot arm. In another example, if first vacuum robot linkage 200 is a forearm portion, outer input shaft 253 may be attached to the upper arm portion of the vacuum robot arm. In yet another example, if first vacuum robot linkage 200 is an upper arm portion, outer input shaft 253 may be attached to the shoulder portion of the vacuum robot arm.

In certain embodiments, the upper end of each of the power input shafts (e.g., 251, 252) may have a series of magnets (e.g., a set of N magnets or a set of S magnets)

attached (e.g., rigidly) circumferentially thereto in a radially outward direction. Each of the driving members (e.g., 241, 242) may have an additional complementary series of magnets (e.g., a set of N magnets or a set of S magnets) attached (e.g., rigidly) to an inner circumference of said driving member in a radially inward direction. The two complementary series of magnets are configured so that each magnet in the series of magnets attached to the upper end of the power input shafts magnetically couples a corresponding magnet in the additional complimentary series of magnets attached to the driving member to rotate said driving member.

For instance, in FIG. 2A, the upper end of inner input shaft 251 has a first series of magnets 261A attached rigidly circumferentially thereto in a radially outward direction. First timing pulley 241 has a second series of magnets 261B attached rigidly to the inner of the first timing pulley 241 in a radially inward direction. Each magnet in the first series of magnets 261A is configured to magnetically couple to a corresponding magnet in the second series of magnets 261B. In this manner, when inner power input shaft 251 rotates, the coupling between magnets in the first series of magnets 261A and the second series of magnets 261B causes rotation of first timing pulley 241. The rotation of inner power input shaft 251 about input axis 230I is relative to and is independent from middle power input shaft 252.

Similarly, in FIG. 2A, the upper end of middle power input shaft 252 has a third series of magnets 262A attached rigidly circumferentially thereto in a radially outward direction. Second timing pulley 242 has a fourth series of magnets 262B attached rigidly to the inner circumference of the second timing pulley 242 in a radially inward direction. Each magnet in the third series of magnets 262A is configured to magnetically couple to a corresponding magnet in the fourth series of magnets 262B. In this manner, when middle power input shaft 252 rotates, the coupling between magnets in the third series of magnets 262A and the fourth series of magnets 262B causes rotation of second timing pulley 242. The rotation of middle power input shaft 252 about input axis 230I is relative to and is independent from inner power input shaft 251 and outer input shaft 253.

In certain embodiments, similar to the above description regarding FIG. 1A, each of the driving members are supported by a corresponding pulley bearing. In FIG. 2A, first timing pulley 241 is supported by a first pulley bearing 246 and second timing pulley 242 is supported by a second pulley bearing 248. The pulley bearings are configured to align (e.g., center) their corresponding driving members and support any external load exerted on their corresponding driving members. In embodiments, the pulley bearings reside inside the interior volume 210 of the first vacuum robot linkage body. As will be described herein below, the interior volume 210 of the first vacuum robot linkage is sealed from the outside environment through at least one input seal and at least one output seal. Placing the pulley bearings inside this sealed interior volume advantageously reduces the risk of outgassing through the bearings.

In the depicted embodiment, each magnet in the first series of magnets 261A is spaced from each corresponding magnet in the second series of magnets 261B by a fifth distance. Similarly, each magnet in the third series of magnets 262A is spaced from each corresponding magnet in the fourth series of magnets 262B by the same fifth distance. A fixed vacuum barrier input seal 260I utilized in this embodiment is configured to seal this fifth distance. The complimentary series of magnets interacts/magnetically couple each other across said fixed vacuum barrier.

Similarly to the embodiments depicted in FIGS. 1A, 1B, in certain embodiments, the drive assembly depicted in FIGS. 2A, 2B includes at least one driven member, such as a first power output pulley 271 and a second power output pulley 272, located inside interior volume 210, proximate to the output side 210O of the first vacuum robot linkage 200. The driven member (e.g., first power output pulley 271 and a second power output pulley 272) is configured to interact with at least one power output shaft, such as inner power output shaft 281 and middle power output shaft 282. Middle power output shaft 282, which may be a hollow cylinder, surrounds inner power output shaft 281, which may be a cylinder.

The body of the first vacuum robot linkage 200 includes an output opening on its output side through which the at least one power output shaft(s) are received. The perimeter of the output opening, which may be referred to herein as "output perimeter" is shown in FIG. 2A as an outer output shaft 283 that surrounds middle power output shaft 282. In certain embodiments, an outer output shaft 283 that aligns with the output perimeter may be attached to the first vacuum robot linkage 200. The power output shafts (inner power output shaft 281 and middle power output shaft 282) as well as outer output shaft 283 may be located outside interior volume 210 and may each be independently rotatable around output axis 230O that is offset laterally from input axis 230I.

In certain embodiments, the lower ends of each of the power output shafts (e.g., 281, 282) may have a series of magnets attached (e.g., rigidly) circumferentially thereto (e.g., in a radially outward direction). Each of the driven members (e.g., 271, 272) may have an additional complimentary series of magnets attached (e.g., rigidly) to an inner circumference of said driven member (e.g., in a radially inward direction). The two complimentary series of magnets are configured so that each magnet in the series of magnets attached to the lower end of each of the power output shafts magnetically couples a corresponding magnet in the additional series of magnets attached to the driven member to rotate the driven member.

For instance, in FIG. 2A, lower end of middle power output shaft 282 has a fifth series of magnets 263A attached rigidly circumferentially thereto in a radially outward direction. First power output pulley 271 has a sixth series of magnets 263B attached rigidly to the inner circumference of the first power output pulley 271 in a radially inward direction. Each magnet in the fifth series of magnets 263A (which may be a set of N magnets or a set of S magnets) is configured to magnetically couple to a corresponding magnet in the sixth series of magnets 263B (which may be a set of N magnets or a set of S magnets). In this manner, when first power output pulley 271 rotates, the coupling between magnets in the fifth series of magnets 263A and the sixth series of magnets 263B causes rotation of middle power output shaft 282 along output axis 230O. The rotation of middle power output shaft 282 is independent of and relative to inner power output shaft 281 and is also independent of and relative to outer output shaft 283. Upper end of middle power output shaft 282 is attached to the lower end effector 220L (i.e., a constituent of the second vacuum robot linkage in FIG. 2A) and rotation of middle power output shaft 282 causes rotation of lower end effector 220L along output axis 230O.

Similarly, in FIG. 2A, lower end of inner power output shaft 281 has a seventh series of magnets 264A attached rigidly circumferentially thereto in a radially outward direction. Second power output pulley 272 has an eighth series of magnets 264B attached rigidly to the inner circumference of the second power output pulley 272 in a radially inward direction. Each magnet in the seventh series of magnets 264A is configured to magnetically couple to a corresponding magnet in the eighth series of magnets 264B. In this manner, when second power output pulley 272 rotates, the coupling between magnets in the seventh series of magnets 264A and the eighth series of magnets 264B causes rotation of inner power output shaft 281 along output axis 230O. The rotation of inner power output shaft 281 is independent of and relative to middle power output shaft 282. Upper end of inner power output shaft 281 is attached to the upper end effector 220U (i.e., a constituent of the second vacuum robot linkage in FIG. 2A) and rotation of inner power output shaft 281 causes rotation of upper end effector 220U along output axis 230O.

In certain embodiments, similar to the above description regarding FIG. 1A, each of the driven members are supported by a corresponding pulley bearing. In FIG. 2A, first power output pulley 271 is supported by a third pulley bearing 276 and second power output pulley 272 is supported by a fourth pulley bearing 278. The pulley bearings are configured to align (e.g., center) their corresponding driven members and support any external load exerted on their corresponding driven members. In embodiments, the pulley bearings reside inside the interior volume 210 of the first vacuum robot linkage body. As will be described herein below, the interior volume 210 of the first vacuum robot linkage is sealed from the outside environment through at least one input seal and at least one output seal. Placing the pulley bearings inside this sealed interior volume advantageously reduces the risk of outgassing through the bearings.

In the depicted embodiment, each magnet in the fifth series of magnets 263A is spaced from each corresponding magnet in the sixth series of magnets 263B by a sixth distance. Similarly, each magnet in the seventh series of magnets 264A is spaced from each corresponding magnet in the eighth series of magnets 264B by the same sixth distance. A fixed vacuum barrier output seal 260O utilized in this embodiment is configured to seal this sixth distance. The complimentary series of magnets interacts/magnetically couple each other across said fixed vacuum barrier.

Similarly to the embodiments depicted in FIGS. 1A, 1B, in certain embodiments depicted in FIGS. 2A, 2B, the drive assembly includes at least one transmission element, such as a first timing belt 291 and a second timing belt 292. The at least one transmission element is configured to transmit power from the at least one driving member (e.g., first timing pulley 241 and second timing pulley 242) to the at least one driven member (e.g., first power output pulley 271 and a second power output pulley 272). For instance, in FIG. 2A, first timing belt 291 is wrapped around first timing pulley 241 on one end and wrapped around first power output pulley 271 on the other opposite end. First timing belt 291 is configured to transmit power (that was received from inner power input shaft 251 through first and second series of magnets 261A and 261B) from first timing pulley 241 to first power output pulley 271 to rotate middle power output shaft 282 (through fifth and sixth series of magnets 263A and 263B) and lower end effector 220L. Similarly, in FIG. 2A, second timing belt 292 is wrapped around second timing pulley 242 on one end and wrapped around second power output pulley 272 on the other opposite end. Second timing belt 292 is configured to transmit power (that was received from middle power input shaft 252 through third and fourth series of magnets 262A and 262B) from second timing pulley 242 to second power output pulley 272 to rotate inner power output shaft 281 (through seventh and eighth series of magnets 264A and 264B) and upper end effector 120U.

In the embodiment illustrated in FIGS. 2A, 2B, a thin fixed vacuum barrier 260I (also referred to as input seal) is created between the power input shaft(s) (e.g., 251, 252) and input timing pulley(s) (e.g., 241, 242) and a thin fixed vacuum barrier 260O (also referred to as output seal) is created between the power output shaft(s) (e.g., 281, 282) and power output pulley(s) (e.g., 271, 272). Sets of magnets are assembled on the side of the power input shaft(s) (e.g., 261A, 262A) and sets of magnets with opposite polarity are assembled on the side of the input timing pulley(s) (e.g., 261B, 262B). Power from the input shaft(s) to the input timing pulley(s) is transmitted through magnetic coupling. A similar arrangement exists on the output side of the vacuum robot linkage. Sets of magnets are assembled on the side of the power output shaft(s) (e.g., 263A, 264A) and sets of magnets with opposite polarity are assembled on the side of the power output pulley(s) (e.g., 263B, 264B). Power from input timing pulley(s) is transmitted through transmission element(s) (e.g., 291, 292) to power output pulley(s) (e.g., 271, 272) and from power output pulley(s) to power output shaft(s) through magnetic coupling. The transmission element(s) may be timing belts with corresponding tensioning arrangements.

With this arrangement, the interior environment 210 inside the vacuum robot linkage 200 is isolated from the outside environment. The fixed vacuum barriers 260I and 260O isolate the internal environment 210 of the vacuum robot linkage 200 from the outside environment. Isolated interior 210 of the vacuum robot linkage may be a controlled environment that is, e.g., in atmospheric pressure or in a different controlled pressure. Any particles that may be generated during operation of the power transmission mechanism (e.g., through friction caused during motion of the timing belt on the pulleys) will be contained inside interior 210 so as to not contaminate the environment that is outside interior 210.

FIG. 2B depicts a top view of one driving member (e.g., first timing pulley 241 or second timing pulley 242), one transmission element (e.g., first timing belt 291 or second timing belt 292), and one driven member (e.g., first power output pulley 271 or second power output pulley 272). In the embodiments depicted in FIGS. 2A and 2B, power is transferred from at least one input shaft (e.g., 251, 252) to at least one driving member (e.g., 241, 242) through fixed vacuum barrier 260I and through at least one set of two series of magnets of opposite polarity (e.g., 261A and 261B or 262A and 262B) on the input side 210I. Then, the power is transmitted from the at least one driving member (e.g., 241, 242) through at least one transmission element (e.g., 291, 292) to at least one driven member (e.g., 271, 272) and from there to at least one power output shaft (e.g., 281, 282) through fixed vacuum barrier 260O and through at least one set of two series of magnets of opposite polarity (e.g., 263A and 263B or 264A and 264B) on the output side 210O. The tension in the at least one transmission element (e.g., 291, 292) may be further controlled through at least one tensioner element. For instance, in FIG. 2B, a first tensioner element 231 configured to control tension in the first timing belt 291 is depicted. Similarly, the driving assembly can include a second tensioner element configured to control tension in second timing belt 292.

As shown in FIG. 2B, the at least one driving member, at least one series of magnets attached to the inner circumference of the at least one driving member on the input side of the vacuum robot linkage, at least one driven member, at least one series of magnets attached to the inner circumference of the at least one driven member on the output side of the vacuum robot linkage, at least one power transmission element, and the at least one tensioner element reside in interior environment 210, which is isolated from the outside environment through fixed vacuum barriers 160I (on the input side) and 160O (on the output side). The at least one power input shaft, at least one series of magnets attached to the outer circumference of the at least one power input shaft, the at least one power output shaft, and the at least one series of magnets attached to the outer circumference of the at least one power output shaft remain outside of interior environment 210.

The various magnets in the series of magnets described in the embodiment of FIGS. 2A, 2B may be permanent magnets or ferromagnetic elements that become magnetically polarized by the associated ring of magnets. As such, the term "magnet" herein refers to permanent magnets as well as to non-permanent magnets (e.g., electromagnets) that are magnetically polarized during use.

Embodiments described herein may be used with vacuum robots (e.g., SCARA vacuum robots) that are included in, for example, transfer chambers. Infinite rotation drive assemblies as described herein enable metal belt robot transmission elements to rotate more than the typical ±140 to ±160 degrees. The infinite rotation drive assemblies enable a full 360+ degree (including multiples of 360 degrees in some embodiments) motion of the robot joints, which is referred to herein as "infinite rotation." According to embodiments, these drive assemblies enable substrate transfers in an elongated rectangular transfer chamber with chambers mounted on all four sides. Robots operating with infinite rotation drive assemblies as described herein can adequately transfer substrates between process chambers linked by an elongated, high aspect ratio, linear mainframe transfer chamber and related platform architectures. The infinite rotation drive assemblies allow a robot to reach all possible chamber locations around the platform and efficient planning of robot paths and trajectories improves throughput while simultaneously avoiding wafer-over-wafer and/or arm-over-wafer positions.

The infinite rotation drive assemblies described herein provide improved substrate transfer systems that perform efficient and precise transport of substrates between chambers while simultaneously avoiding wafer-over-wafer and/or arm-over-wafer arrangements. Avoiding these positions is desirable so that any loose particles or metals remaining on a substrate, end effector and/or wrist member after a process step do not fall onto a substrate underneath, which can result in substrate defects. Furthermore, the ability of the drive assemblies to rotate 0 degrees to 360 degrees or more, enables robot arms, for example, to move in more complex ways to provide fast substrate swaps and/or simultaneous loading of substrates into different chambers. These configurations thus improve system throughput.

While embodiments described herein with respect to FIGS. 1A, 1B, 2A, and 2B refer to infinite rotation drive assemblies, other rotation mechanisms may also be utilized in vacuum robot linkages having an isolated environment from both, the input side and the output side.

Additionally, while embodiments described herein with respect to FIGS. 1A, 1B, 2A, and 2B refer to a vacuum robot linkage coupled to an end effector, it should be understood that certain robot arms may include a plurality of such vacuum robot linkages, where each vacuum robot linkage can be independently sealed from its corresponding input side and its corresponding output side. In this manner each vacuum robot linkage can have its corresponding power transmission mechanism and any particles that may be generated from its corresponding power transmission mechanism will be contained within the interior environment of the particular vacuum robot linkage. For instance, one isolated (from both input and output sides) vacuum robot linkage may be utilized for a shoulder portion and have a first power transmission mechanism for the shoulder portion, a second isolated (from both input and output sides) vacuum robot linkage may be utilized for an upper arm portion and have a second power transmission mechanism for the upper arm portion, a third isolated (from both input and output sides) vacuum robot linkage may be utilized for a forearm portion and have a third power transmission mechanism for the forearm portion, a fourth isolated (from both input and output sides) vacuum robot linkage may be utilized for a wrist portion and have a fourth power transmission mechanism, and so on. The first, second, third, and fourth power transmission mechanism in this example may be the same or different. The input and output seals for the various vacuum robot linkages may also be the same or different.

FIG. 3A and FIG. 3B, are exemplary depictions of a vacuum robot arm 300 according to embodiments. In FIGS. 3A and 3B, the vacuum robot 300 is shown in a resting, non-extended position.

Vacuum robot arm 300 includes an upper arm 302 rotatable about a shoulder axis 304. The upper arm 302 can be connected to a motor (not shown) via a shaft (not shown) that causes independent rotation of the arm 302 about shoulder axis 304. The vacuum robot arm 300 can further include a forearm 306 rotatable relative to the upper arm 302 about a forearm axis 308 at a position offset from the shoulder axis 304.

According to an embodiment, a first vacuum robot linkage, in accordance with embodiments described herein corresponds to forearm 306. In such an embodiment, forearm axis 308 is on the input side (e.g., corresponding to 130I in FIG. 1A and 230I in FIG. 2A). According to embodiments, the forearm 306 can have infinite rotation (e.g., a rotation of at least 360 degrees) about the forearm axis 308. It should be noted, that in certain embodiments, the forearm 306, like the upper arm 302, can be connected to a motor (not shown) via a shaft (not shown) that causes independent rotation of the forearm 306.

In further embodiments, the vacuum robot arm 300 can include a forearm drive assembly for rotating the forearm 306 about the forearm axis 308. The forearm drive assembly can include at least one forearm driving member (e.g., input timing pulley such as 141, 142, 241, 242) and at least one forearm driven member (e.g., power output pulley such as 171, 172, 271, 272) residing in internal environment of within a forearm body of forearm 306 as in first vacuum robot linkage of FIG. 1A and FIG. 2A (e.g., 100 and 200).

In embodiments, at least one forearm driving member is configured to interact with at least one power input shaft (not shown in FIG. 3). The input side of forearm body of forearm 306 (by input axis 308) is sealed with at least one input seal as described herein, e.g., via a magnetic liquid rotary seal or a fixed vacuum barrier. The at least one power input shaft, motor, or any other constituent of the vacuum robot that supplies power to forearm 306 resides, at least partially, outside the at least one input seal and interacts with the at least one driving member as described hereinbefore with respect to FIG. 1A or 2A.

In embodiments, the at least one forearm driven member is configured to interact with at least one power output shaft.

The output side of forearm body of forearm 306 (by output axis 312) is sealed with at least one output seal as described herein, e.g., via a magnetic liquid rotary seal or a fixed vacuum barrier. The at least one power output shaft resides, at least partially, outside the at least one output seal. The at least one driven member interacts with the at least one power output shaft (and with the second vacuum robot linkage) as described hereinbefore with respect to FIG. 1A or 2A.

The forearm drive assembly of robot arm 300 can further include at least one forearm power transmission element comprising a timing belt, as in FIGS. 1A, 1B, 2A, and 2B (e.g., 191, 192, 291, and 292), wherein a first end of each timing belt wraps around its corresponding driving member and a second opposite end of each timing belt is wrapped around its corresponding driven member. The at least one forearm power transmission element is configured to transmit power from the at least one driving member to the at least one driven member in forearm 306.

According to various embodiments, the forearm drive assembly can further include at least one tensioner element, as in FIGS. 1B and 2B (e.g., 131 and 231). Each tensioner element is configured to control tension in its corresponding timing belt.

The at least one forearm driving member, at least one forearm driven member, at least one forearm power transmission element, and at least one tensioner element reside in the interior environment of forearm body of forearm 306, which is isolated from the outside environment due to the at least one input seal and the at least one output seal. In this manner, if any particles are formed during operation of the forearm drive assembly constituents that reside within the interior volume of forearm 306, they remain contained in said interior volume and do not contaminate the outside environment.

Any suitable drive assembly or power transmission mechanism can be utilized inside the interior environment of the vacuum robot linkage (in this case forearm 306) and the drive assembly is not limited to a timing belt and timing pulley power transmission mechanism as illustrated in the FIGS. 1A, 1B, 2A, and 2B. Gear based power transmission mechanisms for instance may also be utilized without concern for particle contamination due to the sealed nature of the vacuum robot linkage.

According to an embodiment, a second vacuum robot linkage, in accordance with embodiments described herein, includes at least one wrist member connected to at least one end effector (such as upper wrist member 310 connected to upper end effector 314 and lower wrist member end effector 316 connected to lower end effector 318 in FIGS. 3A and 3B). With further reference to FIGS. 3A and 3B, the vacuum robot arm 300 can include an upper wrist member 310 connected to upper end effector 314 and a lower wrist member 316 connected to lower end effector 318.

Wrist members 310 and 316 could be part of an additional vacuum robot linkage having its corresponding wrist driving assembly with a power transmission mechanism that is sealed within the interior volume of the vacuum robot linkage corresponding to the wrist. The above description with respect to sealed vacuum robot linkages generally (in FIGS. 1A, 1B, 2A, and 2B) and with respect to forearm 306 in particular can also be implemented on the wrist portion of robot arm 300. Similarly, these features may be implemented on the upper arm portion 302 of vacuum robot arm 300.

With further reference to FIGS. 3A and 3B, wrist members 310 and 316 are rotatable relative to the forearm 306 about a wrist axis 312 at a position offset from the forearm axis 308. The upper wrist member 310 and lower wrist member 316 can each independently have infinite rotation (e.g., a rotation of at least 360 degrees) about the wrist axis 312, as described with respect to FIGS. 1A and 2A. In such an embodiment, wrist axis 312 is on the output side (e.g., corresponding to 130O in FIG. 1A and 230O in FIG. 2A) of the first vacuum robot linkage and on the input side of the second vacuum robot linkage.

The forearm drive assembly in the first vacuum robot linkage (which is forearm 306 in embodiments) is configured to rotate the second vacuum robot linkage (which is wrist members 310, 316 in embodiments) about the output axis of the first vacuum robot linkage (which is the wrist axis in embodiments).

In certain embodiments, vacuum robot arm 300 further includes a third vacuum robot linkage (e.g., upper arm 302) which includes a second drive assembly for rotating the first vacuum robot linkage (e.g., forearm 306) about the input axis of the first vacuum robot linkage (e.g., forearm axis 308). The second drive assembly may include similar constituents to those described above with respect to sealed vacuum robot linkages generally (in FIGS. 1A, 1B, 2A, and 2B) and with respect to forearm 306 in particular.

For instance, the second driving assembly includes at least one upper arm driving member (such as at least one upper arm timing pulley) residing on an upper arm input side of proximate to shoulder axis 304 and configured to interact with at least one upper arm power input shaft. The at least one upper arm power input shaft is located at least partially outside the isolated environment of the upper arm body of upper arm 302. The input side of the upper arm is sealed with at least one upper arm input seal, such as a magnetic liquid rotary seal or a fixed vacuum barrier. In an embodiments, the at least one upper arm input seal is located in spaces between two adjacent upper arm power input shafts (e.g., FIG. 1A) if two or more upper arm power input shafts are present. In certain embodiments, the at least one upper arm input seal is positioned either between the upper arm power input shafts and the driving member(s) of the upper arm driving assembly (e.g., FIG. 2A) or in an open space formed between the at least one upper arm power input shaft and the upper arm input perimeter of the upper arm input opening.

In this example, the second driving assembly includes at least one upper arm driven member (such as at least one power output pulley) residing on an output side of the upper arm body proximate to forearm axis 308 and configured to interact with at least one upper arm power output shaft. The at least one upper arm power output shaft is located at least partially outside the isolated environment of upper arm body of upper arm 302. The output side of the upper arm is sealed with at least one upper arm output seal, such as a magnetic liquid rotary seal or a fixed vacuum barrier. In an embodiment, the at least one upper arm output seal is located either in spaces between two adjacent upper arm power output shafts (e.g., FIG. 1A). In certain embodiments, the at least one upper arm output seal is present between the upper arm power output shafts and the driven member(s) of the upper arm driving assembly (e.g., FIG. 2A) or in an open space formed between the at least one upper arm power output shaft and the upper arm output perimeter of the upper arm output opening.

In this example, the second driving assembly further includes at least one upper arm transmission element (e.g., at least one timing belt) and optionally at least one tensioner element. The at least one transmission element being configured to transfer power from the at least one driving member to the at least one driven member.

The at least one input seal and at least one output seal in the upper arm are configured to isolate the at least one upper arm driving member, at least one upper arm driven member, at least one transmission element, and at least one tensioner element inside the interior environment of the upper arm and away from the outside environment (e.g., main frame) to minimize particle contamination from particles that may be generated during operation of the second driving assembly.

Figure 4:
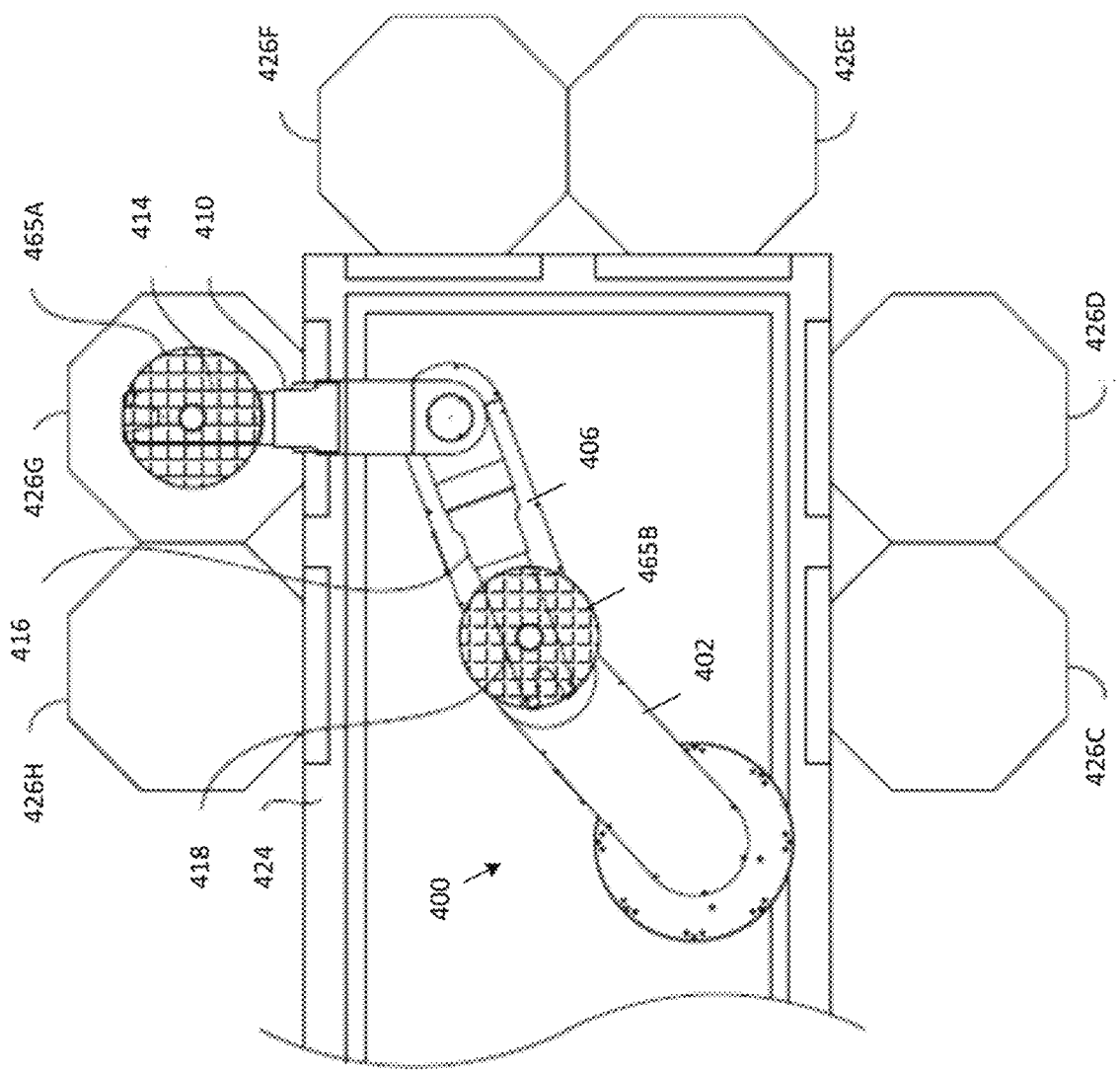
FIG. 4 depicts a top view of a substrate transfer system having a robot arm therein according to various embodiments.

FIG. 4 shows a transfer chamber 424 having a vacuum robot 400 that includes an upper arm 402 (similar to 302 in FIG. 3), a forearm 406 (similar to 306 in FIG. 3), a wrist 410, 416 (similar to wrists 310, 316 in FIG. 3) and an end effector 414, 418 (similar to end effectors 314, 318 in FIG. 3). Each portion of vacuum robot 400 (e.g., the upper arm 402, the forearm 406, the wrist 410,416, and the end effector 414, 418) may have a corresponding infinite rotation drive assembly according to embodiments described herein. The infinite rotation drive assemblies enable the robot arms to move in complex ways that avoid wafer-over-wafer and arm-over-wafer positioning, maximize efficiency and increase wafer throughput.

In FIG. 4, the vacuum robot is shown in an extended position within a transfer chamber 424. The transfer chamber 424 can have a linear configuration or can be in any configuration suitable for semiconductor processing and known to those of ordinary skill in the art (e.g., a cluster configuration). The transfer chamber 424 can be connected to at least one process chamber 926C-H, and the vacuum robot, which contains at least one end effector 414A, 418 movable via an infinite rotation drive assembly as described according to embodiments herein. In FIG. 4, the robot is shown extended into process chamber 426G to place a substrate 465A via wrist member 410 and end effector 414. Also shown, is a substrate 465B resting on end effector 418 connected to wrist member 416; the substrate is waiting to be placed into the same or a different process chamber 926C-H. According to embodiments, the infinite rotation drive assemblies can enable each wrist member 410, 416 to rotate more than 360°, such that, for example, after placing substrate 465A on a support in process chamber 426G, the wrist member can rotate less or more than 360° in a clockwise or counter-clockwise direction to retrieve a substrate (not shown) from any one of process chambers 426C-H in the most efficient manner.

Figure 5:
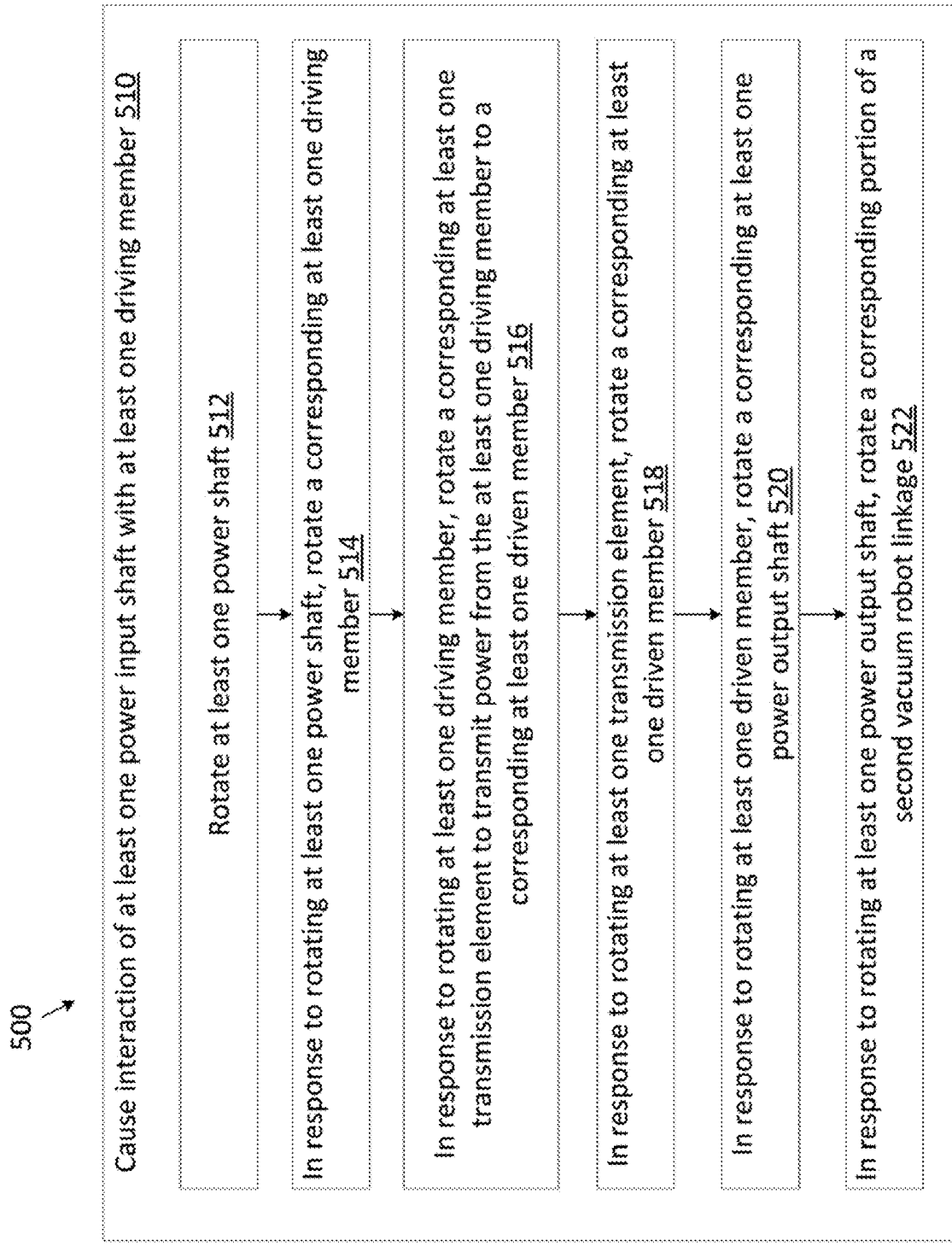
FIG. 5 illustrates a method of operating an infinite rotation drive assembly enclosed in at least one vacuum robot linkage, according to various embodiments.

FIG. 5 illustrates a method 500 of operating a vacuum robot linkage, according to various embodiments described herein. In embodiments, the method includes causing interaction of at least one power input shaft with at least one driving member (510). As described hereinbefore, the at least one power input shaft is received through an input opening on an input side of a body of the first vacuum robot linkage. As further described hereinabove, at least one input seal is positioned, either: between the at least one driving member and the at least one power input shaft or in an open space formed between the at least one power input shaft and an input perimeter of the input opening. In certain embodiments, the at least one input seal is also positioned, if two or more power input shafts are present, in an open space formed between any two adjacent power input shafts.

In embodiments, interaction between each power input shaft and its corresponding driving member may include rotating each power input shaft (512) and, in response to the rotation of each power input shaft, rotating each corresponding driving member (514), as described in more detail below with respect to the embodiments depicted in FIGS. 1A and 2A.

In the vacuum robot linkage depicted in FIG. 1A, two power input shafts are present (inner power input shaft 151 and middle power input shaft 152) and correspondingly two input seals are present (first input seal 161 surrounding inner power input shaft 151 and second input seal 162 surrounding middle power input shaft 152). In the embodiment depicted in FIG. 1A, the upper end of each power input shaft is attached to a corresponding driving member. For instance, the upper end of inner power input shaft 151 is attached to first driving member (which is a first timing pulley 141) and the upper end of middle power input shaft 152 is attached to second driving member (which is second timing pulley 142). In this embodiment, rotating inner power input shaft 151 causes rotation of first timing pulley 141 attached thereto. Similarly, in this embodiment, rotating middle power output shaft 152 causes rotation of second timing pulley 142 attached thereto.

In the vacuum robot linkage depicted in FIG. 2A, two power input shafts are present (inner power input shaft 251 and middle power input shaft 252) and a single input seal is present (input seal 260I located between the power input shafts and the driving members 241 and 242). In the embodiment depicted in FIG. 2A, the upper end of each power input shaft is attached to a corresponding series of magnets (e.g., 261A and 262A) arranged circumferentially in a radially outward direction on the upper end of each power input shaft. Further, in the embodiment depicted in FIG. 2A, each driving member has a complimentary series of magnets (e.g., 261B, 262B) arranged circumferentially in the inner circumference of each driving member in a radially inward direction. In this embodiment, rotating inner power input shaft 251 causes rotation of first set of magnets 261A thereon, which causes rotation of the complimentary set of magnets 261B on the first timing pulley 241 through magnetic coupling between first set of magnets 261A and their complimentary set of magnets 261B across the input seal 260I (e.g., the fixed vacuum barrier). Similarly, in this embodiment, rotating middle power input shaft 252 causes rotation of third set of magnets 262A thereon, which causes rotation of the complimentary set of magnets 262B on the second timing pulley 242 through magnetic coupling between third set of magnets 262A and their complimentary set of magnets 262B across the input seal 260I (e.g., the fixed vacuum barrier).

In embodiments, the interaction between the at least one power input shaft and the at least one driving member is configured to transmit power from the at least one driving member to an at least one driven member via at least one transmission element. In response to rotating any of the driving members described herein, its corresponding transmission element is also rotated to transmits power from the transmission element to its corresponding driven member (516). The transmission element may have its one end wrapped around its corresponding driving member and its other opposite end wrapped around its corresponding driven member. In this arrangement, rotating the transmission element causes rotation of the driven member that said transmission element is wrapped around (518). For instance, rotating timing pulley 141 causes rotation of timing belt 191, which has one of its ends wrapped around timing pulley 141. Rotating timing belt 191 causes rotation power output pulley 171 since the other opposite end of timing belt 191 is wrapped around power output pulley 171. A similar interaction occurs with other timing pulleys (142, 241, and 242)

and their corresponding timing belts (192, 291, and 292) and their corresponding power output pulleys (172, 271, 272).

The interaction between the at least one power input shaft and the at least one driving member is also configured to cause the at least one driven member to interact with at least one power output shaft (520). As described hereinabove, the at least one power output shaft is received through an output opening on an output side of the body of the first vacuum robot linkage. The output opening of the body of the first vacuum robot linkage includes at least one output seal is positioned, either: between the at least one driven member and the at least one power output shaft or in an open space formed between the at least one power output shaft and an output perimeter of the output opening. In certain embodiments, the at least one output seal is also positioned, if two or more power output shafts are present, in an open space formed between any two adjacent power output shafts.

In embodiments, interaction between each driven member and its corresponding power output shaft may include rotating each driven member and in response to the rotation of each driven member causing rotation of each corresponding power output shaft (520), as described in more detail below with respect to the embodiments depicted in FIGS. 1A and 2A. A degree of rotation that is achieved may be +/−360° or more. For example, one or more segments of the robot arm may be infinitely rotatable.

In the vacuum robot linkage depicted in FIG. 1A, two power output shafts are present (inner power output shaft 181 and middle power output shaft 182) and correspondingly two output seals are present (first output seal 163 surrounding inner power output shaft 181 and second output seal 164 surrounding middle power output shaft 182). In the embodiment depicted in FIG. 1A, the lower end of each power output shaft is attached to a corresponding driven member. For instance, the lower end of inner power output shaft 181 is attached to second driven member (which is a second power output pulley 172) and the lower end of middle power output shaft 182 is attached to first driven member (which is first power output pulley 171). In this embodiment, rotating driven member 172 causes rotation of inner power output shaft 181 attached thereto. Similarly, in this embodiment, rotating driven member 171 causes rotation of middle power output shaft 182 attached thereto.

In the vacuum robot linkage depicted in FIG. 2A, two power output shafts are present (inner power output shaft 281 and middle power input shaft 282) and a single output seal is present (output seal 260O located between the power output shafts and the driven members 271 and 272). In the embodiment depicted in FIG. 2A, the lower end of each power output shaft is attached to a corresponding series of magnets (e.g., 263A and 264A) arranged circumferentially in a radially outward direction on the lower end of each power output shaft. Further, in the embodiment depicted in FIG. 2A, each driven member has a complimentary series of magnets (e.g., 263B, 264B) arranged circumferentially in the inner circumference of each driven member in a radially inward direction. In this embodiment, rotating second power output pulley 272 causes rotation of eighth set of magnets 264B thereon, which causes rotation of the complimentary set of magnets 264A on the inner power output shaft 281 through magnetic coupling between set of magnets 264B and their complimentary set of magnets 264A across the output seal 260O (e.g., the fixed vacuum barrier). Similarly, in this embodiment, rotating first power output pulley 271 causes rotation of sixth set of magnets 263B thereon, which causes rotation of the complimentary set of magnets 263A on the middle power output shaft 282 through magnetic coupling between set of magnets 263B and their complimentary set of magnets 263A across the output seal 260O (e.g., the fixed vacuum barrier).

In embodiments, rotation of each power output shaft causes rotation of a corresponding portion in a second vacuum robot linkage that each power output shaft is connected to (522). For instance, with reference to FIGS. 1A and 2A, rotating inner power output shaft (181, 281), which is attached in its upper end to an upper end effector (120U, 220U), causes rotation of the upper end effector. Similarly, with reference to FIGS. 1A and 2A, rotating middle power output shaft (182, 282), which is attached in its upper end to a lower end effector (120L, 220L), causes rotation of the lower end effector. In certain embodiments, the method includes causing rotation of the second vacuum robot linkage about an output axis of the first vacuum robot linkage for an infinite rotation of at least 360 degrees.

In certain embodiments, vacuum robots described herein can include an arm rotatable about a shoulder axis, a forearm rotatable relative to the arm about a forearm axis at a position offset from the shoulder axis, a first wrist member rotatable relative to the forearm about a wrist axis at a position offset from the shoulder axis. Each of these constituents of the vacuum robot arm (upper arm, forearm, wrist, end effector) may be operable by a corresponding driving assembly whose components at least partially reside in a sealed interior volume of a corresponding vacuum robot linkage. As such, in certain embodiments, the instant disclosure also encompasses methods for controlling a vacuum robot having any combination of the above constituents. A degree of rotation that is achieved by any of these linkages may be +/−360° or more. For example, one or more linkages of the robot arm may be infinitely rotatable.

A controller that controls the vacuum robot and various constituents of the vacuum robot arm and the various driving assemblies in each of the vacuum robot linkages may be and/or include a computing device such as a personal computer, a server computer, a programmable logic controller (PLC), a microcontroller, and so on. The controller may include one or more processing devices, which may be general-purpose processing devices such as a microprocessor, central processing unit, or the like. More particularly, the processing device may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device may also be one or more special-purpose processing devices such as an application specific integrated circuit (ASIC), a field programmable gate array (FPGA), a digital signal processor (DSP), network processor, or the like. The controller may include a data storage device (e.g., one or more disk drives and/or solid state drives), a main memory, a static memory, a network interface, and/or other components. The controller may execute instructions to perform any one or more of the methodologies and/or embodiments described herein, such as operations of method 500. The instructions may be stored on a computer readable storage medium, which may include the main memory, static memory, secondary storage and/or processing device (during execution of the instructions). The controller may also be configured to permit entry and display of data, operating commands, and the like by a human operator.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A first vacuum robot linkage comprising:
a body having an input side and an output side, wherein the input side receives through an input opening a plurality of power input shafts, and wherein the output side receives through an output opening a plurality of power output shafts; and
a drive assembly for rotating a second vacuum robot linkage about an output axis, the drive assembly comprising:
a plurality of driving members configured to interact with the plurality of power input shafts;
at least one input seal comprising a first fixed vacuum barrier positioned in the input opening between the plurality of driving members and the plurality of power input shafts, and configured to at least partially isolate an internal environment of the first vacuum robot linkage from an outside environment, wherein the plurality of driving members are supported by a first plurality of bearings that substantially surround the at least one input seal;
a plurality of driven members configured to interact with the plurality of power output shafts, wherein at least one of the plurality of power output shafts is attached to the second vacuum robot linkage;
at least one output seal comprising a second fixed vacuum barrier positioned in the output opening between the plurality of driven members and the plurality of power output shafts, and configured to at least partially isolate the internal environment of the first vacuum robot linkage from the outside environment, wherein the plurality of driven members are supported by a second plurality of bearings that substantially surround the at least one output seal; and
a plurality of transmission elements configured to transmit power from the plurality of driving members to the plurality of driven members.

2. The first vacuum robot linkage of claim 1, wherein the first vacuum robot linkage is a vacuum robot forearm, and wherein the second vacuum robot linkage comprises at least one end effector.

3. The first vacuum robot linkage of claim 1, wherein:
the plurality of power input shafts comprises:
an inner power input shaft, and
a middle power input shaft surrounding the inner power input shaft and spaced by a first distance from the inner power input shaft and by a second distance from an input perimeter of the input opening,
wherein the inner power input shaft and the middle power input shaft are independently rotatable about an input axis of the first vacuum robot linkage;
the plurality of power output shafts comprises:
an inner power output shaft, and
a middle power output shaft surrounding the inner power output shaft and spaced by a third distance from the inner power output shaft and by a fourth distance from an output perimeter of the output opening,
wherein the inner power output shaft and the middle power output shaft are independently rotatable about an output axis of the first vacuum robot linkage that is offset laterally from the input axis;
the plurality of driving members comprises:
a first driving member configured to interact with the inner power input shaft and to activate a first transmission element, and
a second driving member configured to interact with the middle power input shaft and to activate a second transmission element;
the plurality of transmission elements comprises:
a first transmission element configured to transmit power from the first driving member to a first driven member, and
a second transmission element configured to transmit power from the second driving member to a second driven member;
the plurality of driven members comprises:
the first driven member configured to utilize power transmitted from the first transmission element to interact with the middle power output shaft to move a lower portion of the second vacuum robot linkage, and
the second driven member configured to utilize power transmitted from the second transmission element to interact with the inner power output shaft to move an upper portion of the second vacuum robot linkage.

4. The first vacuum robot linkage of claim 3, wherein the lower portion of the second vacuum robot linkage is a lower end effector, and wherein the upper portion of the second vacuum robot linkage is an upper end effector.

5. The first vacuum robot linkage of claim 1,
wherein the plurality of driving members comprises a plurality of timing pulleys;
wherein the plurality of driven members comprises a plurality of power output pulleys;
wherein the plurality of transmission elements comprises a plurality of timing belts; and
wherein the second vacuum robot linkage is rotatable about the output axis of the first vacuum robot linkage by at least 360 degrees.

6. The first vacuum robot linkage of claim 5, further comprising at least one tensioner element configured to control tension in the plurality of timing belts.

7. The first vacuum robot linkage of claim 5,
wherein a first series of magnets is attached circumferentially to an inner power input shaft of the plurality of power input shafts in a radially outward direction,
wherein a second series of magnets is attached to an inner circumference of a first timing pulley of the plurality of timing pulleys in a radially inward direction,
wherein each magnet in the first series of magnets is configured to magnetically couple to a corresponding magnet in the second series of magnets to rotate the first timing pulley,
wherein each magnet in the first series of magnets is spaced from each corresponding magnet in the second series of magnets by a fifth distance,
wherein a third series of magnets is attached circumferentially to a middle power input shaft of the plurality of power input shafts in a radially outward direction, wherein a fourth series of magnets is attached to an inner circumference of a second timing pulley of the at least one timing pulleys in a radially inward direction, wherein each magnet in the third series of magnets is configured to magnetically couple to a corresponding magnet in the fourth series of magnets to rotate the second timing pulley, wherein each magnet in the third series of magnets is spaced from each corresponding magnet in the fourth series of magnets by the fifth distance, and wherein the at least one input seal is configured to seal the fifth distance.

8. The first vacuum robot linkage of claim 5, wherein a fifth series of magnets is attached circumferentially to a middle power output shaft of the plurality of power output shafts, wherein a sixth series of magnets is attached to an inner circumference of a first power output pulley of the plurality of power output pulleys, wherein each magnet in the fifth series of magnets is configured to magnetically couple to a corresponding magnet in the sixth series of magnets to rotate the first power output pulley, wherein a seventh series of magnets is attached circumferentially to an inner power output shaft of the plurality of power output shafts, wherein an eighth series of magnets is attached to an inner circumference of a second power output pulley of the plurality of power output pulleys, wherein each magnet in the seventh series of magnets is configured to magnetically couple to a corresponding magnet in the eighth series of magnets to rotate the second power output pulley, wherein each magnet in the fifth series of magnets is spaced from each corresponding magnet in the sixth series of magnets by a sixth distance, wherein each magnet in the seventh series of magnets is spaced from each corresponding magnet in the eighth series of magnets by the sixth distance, and wherein the at least one output seal is configured to seal the sixth distance.

9. The vacuum robot linkage of claim 5, wherein the at least one input seal and the at least one output seal independently comprise a fixed vacuum barrier.

10. A vacuum robot comprising:

an upper arm rotatable about a shoulder axis;

a first vacuum robot linkage comprising a forearm body rotatable relative to the upper arm about a forearm axis at a position offset from the shoulder axis, wherein the forearm body has an input side and an output side, wherein the input side receives through an input opening a plurality of power input shafts, and wherein the output side receives through an output opening a plurality of power output shafts; and a second vacuum robot linkage comprising at least one end effector rotatable relative to the forearm about an output axis of the first vacuum robot linkage, wherein the first vacuum robot linkage comprises a first drive assembly for rotating the second vacuum robot linkage about the output axis, the first drive assembly comprising:

a plurality of driving members configured to interact with the plurality of power input shafts;

at least one input seal comprising a first fixed vacuum barrier positioned in the input opening between the plurality of driving members and the plurality of power input shafts, and configured to at least partially isolate an internal environment of the first vacuum robot linkage from an outside environment, wherein the plurality of driving members are supported by a first plurality of bearings that substantially surround the at least one input seal;

a plurality of driven members configured to interact with the plurality of power output shafts, wherein at least one of the plurality of power output shafts is attached to the second vacuum robot linkage;

at least one output seal comprising a second fixed vacuum barrier positioned in the output opening between the plurality of driven members and the plurality of power output shafts, and configured to at least partially isolate the internal environment of the first vacuum robot linkage from the outside environment, wherein the plurality of driven members are supported by a second plurality of bearings that substantially surround the at least one output seal; and a plurality of transmission elements configured to transmit power from the plurality of driving members to the plurality of driven members.

11. The vacuum robot of claim 10, wherein the plurality of driving members comprises a plurality of timing pulleys;

wherein the plurality of driven members comprises a plurality of power output pulleys;

wherein the plurality of transmission elements comprises a plurality of timing belts and at least one tensioner element configured to control tension in the plurality of timing belts; and wherein the second vacuum robot linkage is rotatable about an output axis of the first vacuum robot linkage by at least 360 degrees.

12. A method for operating a first vacuum robot linkage comprising:

causing interaction of a plurality of power input shafts with a plurality of driving members, wherein the plurality of power input shafts is received through an input opening on an input side of a body of the first vacuum robot linkage, and wherein at least one input seal comprises a first fixed vacuum barrier positioned between the plurality of driving members and the plurality of power input shafts and is configured to at least partially isolate an internal environment of the first vacuum robot linkage from an outside environment, wherein the plurality of driving members are supported by a first plurality of bearings that substantially surround the at least one input seal, wherein said interaction is configured to:

transmit power from the plurality of driving members to a plurality of driven members via a plurality of transmission elements, and cause one of the plurality of driven members to interact with at least one power output shaft of a plurality of power output shafts that is attached to a second vacuum robot linkage, wherein the plurality of power output shafts is received through an output opening on an output side of the body of the first vacuum robot linkage, and wherein at least one output seal comprises a second fixed vacuum barrier positioned between the plurality of driven members and the plurality of power output shafts and is configured to at least partially isolate the internal environment of the first vacuum robot linkage from the outside environment, wherein the plurality of driven members are supported by a second plurality of bearings that substantially surround the at least one output seal.

13. The method of claim 12,
wherein the plurality of driving members comprises a plurality of timing pulleys;
wherein the plurality of driven members comprises a plurality of power output pulleys; and
wherein the plurality of transmission elements comprises a plurality of timing belts and at least one tensioner element configured to control tension in the plurality of timing belts.

14. The method of claim 12, further comprising causing rotation of the second vacuum robot linkage by at least 360 degrees about an output axis.

* * * * *